United States Patent [19]

Boronyák et al.

[11] Patent Number: 4,532,087
[45] Date of Patent: Jul. 30, 1985

[54] PLATE FOR COLUMNS PERFORMING DISTILLATION AND/OR ABSORPTION PROCESSES

[75] Inventors: Imre Boronyák; László Gyökhegyi, both of Budapest, Hungary

[73] Assignee: Kozponti Valto es Hitelbank RT., Budapest, Hungary

[21] Appl. No.: 560,827

[22] Filed: Dec. 13, 1983

[30] Foreign Application Priority Data

Dec. 23, 1982 [HU] Hungary ............... 4151/82

[51] Int. Cl.$^3$ .............................................. B01F 3/04
[52] U.S. Cl. ................. 261/114 JP; 202/158; 261/114 R
[58] Field of Search ......... 261/114 R, 114 JP, 114 A, 261/114 TC, 114 VT; 202/158

[56] References Cited

U.S. PATENT DOCUMENTS

| | | | |
|---|---|---|---|
| 1,442,414 | 1/1923 | Rose | 261/114 JP |
| 2,523,126 | 9/1950 | Long | 261/114 A |
| 2,609,277 | 9/1952 | McNamara | 261/114 R |
| 2,924,441 | 2/1960 | Osborne | 261/114 JP |
| 3,045,989 | 7/1962 | Kittel | 261/114 JP |
| 3,364,988 | 1/1968 | Hartmann | 261/114 JP |
| 3,417,975 | 12/1968 | Williams et al. | 261/114 JP |
| 4,238,426 | 12/1980 | Slobodyanik | 261/114 JP |
| 4,275,021 | 6/1981 | Kirkpatrick et al. | 202/158 X |
| 4,305,895 | 12/1981 | Heath et al. | 202/158 X |

FOREIGN PATENT DOCUMENTS

| | | | |
|---|---|---|---|
| 2015213 | 10/1971 | Fed. Rep. of Germany | 261/114 JP |
| 86168 | 12/1971 | Fed. Rep. of Germany | 261/114 JP |
| 411873 | 4/1974 | U.S.S.R. | 261/114 VT |
| 423481 | 9/1974 | U.S.S.R. | 261/114 VT |

Primary Examiner—Richard L. Chiesa
Attorney, Agent, or Firm—Handal & Morofsky

[57] ABSTRACT

A plate for columns performing distillation and/or absorption processes in which through openings in the plate body are provided with an inlet weir and with an outlet weir and in such openings inserts (8-21; 30) are fixedly mounted containing through holes with changing cross-sections, each insert (8-12; 30) contains a through hole which with respect to the flow direction of vapor and/or gas has an inlet zone (19;25) with an inwardly decreasing cross-section, an intermediate cylindrical zone (20, 26) connected thereto and, as a continuation thereof, an outlet zone (21;27) having an outwardly increasing cross-section; the plate body (2) and the upper surface of the inserts (8-12; 30) are aligned in a common or essentially common plane and, at least some of the inserts (8-12; 30); have through holes with their geometrical axis (x) being inclined under an acute angle ($\alpha$) with respect to the upper plane of the plate body (2).

15 Claims, 6 Drawing Figures

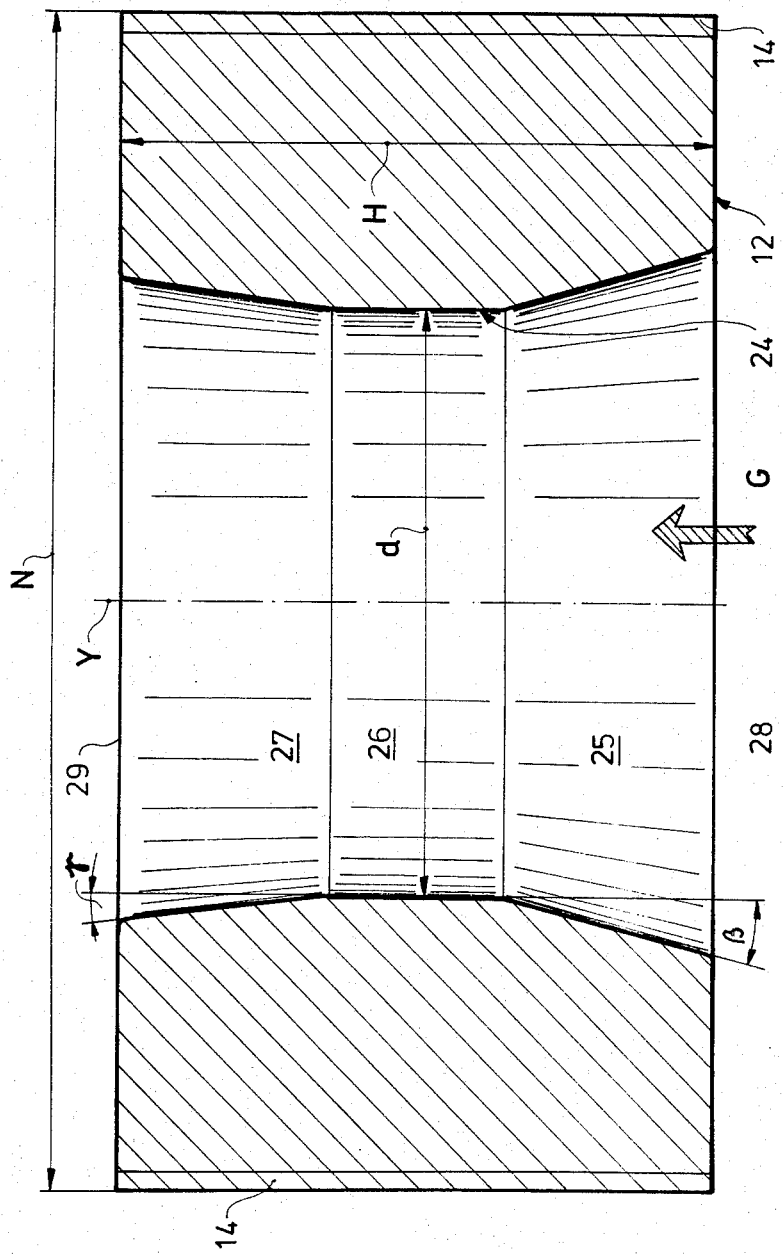

PLATE FOR COLUMNS PERFORMING DISTILLATION AND/OR ABSORPTION PROCESSES

FIELD AND BACKGROUND OF THE INVENTION

The invention relates to a plate for columns performing distillation and/or absorption processes, having through openings in the plate body provided with inlet weir and—in given case—with outlet weir.

There are known many kinds of columns for performing distillation and/or absorption processes. The most widely used of them are the plate columns. The plates are designed to perform an intimate contact between the vapour and/or gas streaming upwards in the column and the liquid descending from the top. Distinction can be made between types of plates with and without drainage. Plates with drainage are the so-called bubble cap plates, valve plates and screen plates depending on their structural elements for contacting both phases (such as bubble caps, valves, holes). Valve plates and screen plates may also be used in combination.

Up-to-date screen plates can be constructed as—in view of the main flow direction of the liquid—simple or multiple stream cross-flow plates or centrifugal plates, wherein there are drilled or pressed circular through holes perpendicular to the plane of the plate body and having diameters of 10 to 15 mm. The holes are distributed at the corners of squares or triangles so that their centres are arranged at distances of 20 to 45 mm.

To form an opinion of up-to-date screen plates (as well as other kinds of column plates) one has to consider several aspects of the process to be carried out, the operation of the column and the costs of the construction. Until now, it is impossible to create a numerical value which would express all these aspects, therefore screen plates can not be characterized by an objective number obtained from measurements, thus, the aspects can be observed only individually, and the factors should then be compared to such values of other plates.

A comparison of the technological aspects can be made in view of the flow speed range (as industrially available) of the vapour and/or gas plotted against the whole cross section of the plate—for a given construction, for a given mixture to be separated and/or for a given combination of gas and liquid, at a constant flow rate of the vapour and/or gas and the liquid ($m^3/h$)—in view of the hydraulic resistance (pressure drop) due to the plate when operated; as well as in view of the possible efficiency to be attained in the industrially available flow speed range of the vapour and/or gas. These three factors are not independent of each other, because the pressure drop caused by the plates and the plate efficiency depend on the speed of the vapour and/or gas. Plate efficiency is interpreted as a ratio between the actual separation and the separation which would be obtained if a thermodynamic equilibrium were reached on the plates. (Under separation there is meant a matter separation due to distillation or absorption e.g. separation of a liquid from another liquid by distillation as alcohol from water; separation of a gas component from a gas mixture by absorption so that the gas component is absorbed in a liquid as $CO_2$ in water.)

As screen plates have only a few structural dimensions having influence on the technology (diameter of the plate, length and height of the outlet weir, diameter of the holes, distribution of the holes, thickness of the plate body), their effect on the flow speed of the gas, on the hydraulic resistance (pressure drop) and on the efficiency may be examined separately. In this respect it has to be noted that the quotient of the plate diameter and the length of the chord-like outlet weir generally equals to 0.6 to 0.7 in the case of simple stream plates and 0.6 to 0.5 for double stream plates. With modern constructions, the height of the outlet weir is max. 20 mm. because a higher weir would only increase the hydraulic resistance (pressure drop) occuring on the plate. This designing principle is based upon the experimentally prooved fact that, at the place of contacting both phases, the transfer of matter between the vapour and/or gas and the liquid takes place mainly spontaneously, therefore it is not necessary to have a long flow path for the vapour and/or gas.

The optimum distribution factor of the holes (a non-dimensional quotient of the hole centres and the hole diameter)—as proved by tests (Chemie-Ing. Technik. 34./1962/ No. 4, p. 290)—equals about 2.8. In case of a lower distribution factor, the efficiency decreases due to the fact that the vapour and/or gas streams passing through the holes of relatively large diameter and arranged too close to each other, are fusing into big bubbles, thus, the transfer of matter is adversely influenced. Although with the decrease of the distribution factor of the holes the number of holes in a plate and the sum of their cross sections is increasing, which results in a decrease of the pressure drop, this decrease has in general no influence on the decrease of efficiency mentioned above. At the same time, increasing the distribution factor of the holes higher than its optimum value (2.8) results in an increase of the pressure drop and has an adverse effect on the efficiency, because between holes which are distributed at too large distances there remains a considerable amount of liquid which is not contacted with the primary vapour and/or gas streaming upwards.

When considering operational aspects, there must be three main requirements in sight: the holes must not be stopped, the liquid—in counterflow to the gas and/or vapour streaming upwards—should not run through the holes, and the screen plate should be operated—with unchanged efficiency—in a wide range of the flow speed of the vapour and/or gas i.e. within wide charge limits. An increase of the flow speed involves namely an increase of the production (e.g. a greater amount of the material obtained), and the decrease of the flow speed means a decrease of the chargeing possibility. Due to operational conditions, it may be necessary either to increase or to decrease the production.

Flow-down of the liquid through the holes of the screen plate takes place when the flow rate of the vapour and/or gas is low, and thus, the kinetic energy of the vapour and/or gas streaming upwards is not able to maintain the liquid over the surface of the plate body. Flow-down ceases when the lower limit of the vapour and/or gas load on the screen plate is reached and since then, the efficiency of the screen plate remains constant until the upper limit of the vapour and/or gas load is reached, however, the pressure drop increases continuously.

The most advantageous operational feature with modern screen plates—as already mentioned—resides in that the efficiency is unchanged over a wide range of flow speed of the vapour and/or gas, as well as in the fact that stopping, clogging of the holes does not take place due to their relatively great dimension, however, they have the disadvantage that the pure liquid flowing onto the plate has a greater density than the liquid already containing vapour and/or gas, present on that part of the plate at a distance from the liquid inlet. Due to this fact, flow-down of the liquid of greater density is more intensive near the inlet than at places of the plate situated at a distance therefrom, due to the fact that the hydrostatic pressure of the pure liquid is higher than that of the "foamy" liquid. In order to eliminate this phenomenon, the plate is, according to a known solution, formed with an inclined part on the inlet side, or the whole plate is mounted in the column so that it is inclined towards the main flow direction. These constructional changes are influencing—obviously in adverse sense—the price of the screen plates.

The flow speed range of the vapour and/or gas to be realized with up-to-date screen plates can, due to the sophisticated influences, only be determined experimentally. Due to the fact that there are only few and relatively simple constructional dimensions exerting influences, the modern screen plates can be classed among the cheapest ones, and still they become technologically less advantageous only in the range of the higher flow speeds of the vapour and/or gas as compared to the valve plates or to the valve screen plates which are much more expensive.

The modern screen plate is operationally more advantageous than the plate having mobile valves or the screen plate with valves because the mobile valves are subject to wear and their operational safety is decreased by the risk of seizure and/or hanging up.

There were attempts to decrease the hydraulic resistance (pressure drop) of the screen plates thereby that instead of drilling or pressing holes with sharp edges, protruding necks were drawn upwardly out of the plate body so that the upwardly flowing vapour and/or gas stream was introduced through a rounded inlet into the liquid layer on the plate. Experiments show that thereby the hydraulic resistance (pressure drop) of the screen plate can be decreased by an average value of 30% depending on the rounding-off angle of the inlet.

Observations and measurements prooved that the height of the liquid stream flowing over the screen plate is not uniform but, due to the liquid friction, it decreases from the inlet weir towards the outlet weir. The difference in height is particularly considerable with screen plates with high liquid load: it can be even 15 mm over 1 m of the plate width. This so-called hydraulic gradient has the effect that near to the outlet weir i.e. at the place of the lower liquid level a higher amount of vapour and/or gas flows through the plate than near to the inlet, in other terms: the screen plate does not operate uniformly. This fact is adversely influencing the efficiency of the whole screen plate.

In order to eliminate the hydraulic gradient, according to a known solution, straight slots are split between the rows of holes in the plate body, and then they are widened by pressing. Through these slots the vapour and/or gas is flowing out obliquely to the plane of the plate body towards the outlet and transmits an impulse to the liquid, being sufficient to overcome the liquid friction so that the hydraulic gradient is practically eliminated. By this relatively simple constructional change, due to which also an eventual backward mixing of the liquid towards the inlet can be prevented. The efficiency of this kind of screen plates having slots is considerably increased but without a meritorious increase of the hydraulic resistance (pressure drop).

As a result of further developments in the field, screen plates were made of expanded sheets, wherein that part of the plate remaining between the inlet and the outlet area is formed of expanded sheet sections. The slots of the adjacent sheet sections are oppositely oriented. The rhomboidal slots of e.g. 42±5 mm should have to direct the vapour and/or gas flowing upwardly therethrough in an oblique direction. As, however, due to the production technology of the expanded sheets, the rhomboidal slots have only a limited obliquity, while their dimension is greater than the hole diameter (10 to 13 mm.) of the modern screen plates, and the thickness of the bars separating the slots is generally small (2 to 3 mm.), only a part of the upwardly streaming vapour and/or gas is forced to flow in an inclined direction. For the same reason, the vapour and/or gas streams flowing only at distances of few millimeters from each other, easily unite to big bubbles (coalescence). This is why the efficiency of the plates made of expanded sheets is lower than that of well constructed screen plates. At the same time, as a result of the high vapour and/or gas speed, the hydraulic resistance of the plates made of expanded sheets is in spite of the big flow area resulting from the big slots, higher—within the efficiency range to be reached at all—than that of the screen plates at the same or at a higher efficiency. The higher energy consumption due to the higher resistance is also disadvantageous.

A further drawback of the plates made of expanded sheets resides in that a flow-down of the liquid through the big slots making a big flow area can not be eliminated except by a vapour and/or gas speed which is higher than required in the case of the modern screen plates. Therefore, such plates made of expanded sheets are particularly sensible to changing load or to load variations.

A further technological drawback resides in that on the one part, that the plates made of expanded sheets may be deformed under effect of heat in the column (and thereby the width of the slots would further be increased), on the other part, their efficiency—under comparable conditions—is much more lower than that of e.g. the valve plates.

It can be stated from what is said above that plates made of expanded sheet does not represent a general progress in view of the procedure to be carried out.

As to the aspects of operation, the slots of the expanded sheet are not subject to clogging as they are big and obliquely directed. Further on, the plates made of expanded sheets are not expensive. In spite of all this, such structures are inferior to the modern screen plates because of their low efficiency and relatively limited range of loadability. Thus, it can be stated that although the slotted screen plates have somewhat increased efficiency over the conventional screen plates but their hydraulic resistance (pressure drop) is not lower than that of the screen plates. On the other hand, the efficiency of the plates made of expanded sheet is necessarily lower than that of the modern screen plates, and also their hydraulic resistance only seems to be more advantageous.

The invention aims at developing a plate construction the efficiency of which, for a wide range of loading, at least reaches or surpasses that of the most modern valve plates or valve screen plates but its pressure drop is lower and besides also the risk of stopping and flow-down is decreased. A further aim of the disclosure resides in that the production costs of the plate construction according to the invention should be lower than the production costs of the valve plates or screen valve plates.

The invention is based upon the following recognition:

On the plates of the distillation or absorption columns the efficiency of the separation process is not specified basically by the resistance of the vapour and/or gas and the liquid (vapour or gas film, and liquid film) against molar diffusion, it rather depends on the intensity of the macroscopic mixing carried out on the plates. According to experiments, as already referred to, the matter transfer between the vapour and/or gas and the liquid (distillation or absorption) takes place mainly momentaneously at the place of contact of both phases, thus, the efficiency of the distillative or absorptive matter transfer depends on how effectively the mixing itself can move away the liquid quantity contacting the vapour and/or gas in order that thereby a free way be left for the liquid not yet contacted with the vapour and/or gas. As known, the mixing on the plates is performed only by the upwards flowing vapour and/or gas streams—through pulse transfer—while the liquid stream conveys only that quantity being fully or partially mixed with this vapour and/or gas.

When considering the above recognition, we met the phenomenon or process known as "mixing model" in the art. It is prooved to be proper also by recent results of the development as set forth below:

As according to the mixing model, the mixing effect on a plate is carried out only by the vapour and/or gas stream, it is convenient to represent the flow direction of the vapour and/or gas on spatial Cartesian coordinates X-Y-Z in order to investigate mixing intensity, wherein the main flow direction of the liquid in the plane of the plate. Y is the coordinate perpendicular thereto and Z is the vertical coordinate.

On modern screen plates the vapour and/or gas flows—except for a possible slight spiral motion—only vertically, thus, it is transmitting an impulse to the liquid only along the axis Z, therefore there is no full turbulence, thus, the efficiency of the mixing of the liquid may not be 100%. This explains why on modern screen plates increasing the height of the outlet weir, and thereby the height of the liquid layer on the plate, over 20 mm does not result in a substantial increase of the plate efficiency.

According to the mixing model, on slotted screen plates the vapour and/or gas is mixing the liquid quantity by a impulse transfer not only in the direction of axis Z but also in the direction of axis X, and this results in a better efficiency. In principle, the oblique vapour and/or gas inlets of the expanded sheets are assumed to lead to the same result. On plates made of expanded sheet sections with slots oriented in different directions, the liquid is mixed in the directions of the axes X and Y, and due to the buoyancy acting on the vapour and/or gas bubbles also in the direction of axis Z. As, however, due to the slight obliquity of the slots, a part of the vapour and/or gas flowing through the slots of the expanded sheet flows also in vertical direction, mixing in the directions X and Y loses in its efficiency and the mixing effect in the direction Z remains dominant. Although the mixing effect is increased as compared to that of the screen plates, this, however, does not result—due to the above-mentioned coalescence—in an increase of the efficiency; because the mixing effect of the larger bubbles is namely not so intensive as that of a greater amount of smaller bubbles. At the same time, the big bubbles developing due to the coalescence are prevented from breaking up (dispersion) as a result of incomplete turbulence on the plate.

SUMMARY OF THE INVENTION

On the basis of the above recognitions, the aim as set above is reached according to the invention by a plate for columns performing distillation and/or absorption processes, having through openings in the plate body provided with an inlet weir and—in given case—with an outlet weir, being characterized in that in the openings there are fixed inserts each comprising a through hole containing an inlet zone having with respect to the flow direction of the vapour and/or gas, as inwardly decreasing cross section, an intermediate cylindrical zone connected thereto, and as a continuation thereof, an outlet zone having an outwardly increasing cross section; and that at least some of the inserts have through holes with geometrical axis being inclined under an acute angle to the upper plane of the plate body. According to an important feature of the upper invention, the inlet zone of the through holes with inclined axis, in top view, is at least substantially covered by the wall bounding the through hole. An advantageous embodiment of the invention is characterized by that the inlet zone and the outlet zone of the through holes with inclined axis are formed in geometrical sense by circular cones with a missing generatrix originating from one point lying on their base circles. It is also advantageous when the points lying on the base circles of the inlet zone and of the outlet zone, where no generatrix originates from, are aligned in or near to the same vertical line.

An essential feature of the plate according to the invention consists in that the angle included between the inclined axis of the inserts and the upper plane of the plate body is 45° or nearly 45°. It is advantageous when the half cone angle of the inlet zone is greater than the half cone angle of the outlet zone, and when the half cone angle of the inlet zone is 9.5° to 10.5°, advantageously about 10°, further when the half cone angle of the outlet zone is 3° to 4°, advantageously about 3.5°.

According to another feature of the invention, the plate body and the upper surface of the inserts are aligned in a common plane, and the edges of the inlet opening and the outlet opening are rounded.

Advantageously, the through openings formed in the plate body and the outer boundary surface of the inserts are provided with threads and the inserts are secured in the openings through threaded connection.

According to a further embodiment of the invention, in the area adjacent to the inlet weir, there are provided advantageously in several rows being parallel to the outlet weir, inserts in the plate body, wherein the inclined geometrical axes of the through holes are—in top view—oriented in the same or substantially the same direction as the main flow direction of the liquid across the plate. It is further expendient when in the area of the plate body lying opposite to the inlet weir—advantageously adjacent to the outlet weir—there are provided inserst containing through holes with vertical geometrical axis, arranged expediently in several rows being parallel to each another and, in given case, to the outlet weir, and when in the central area of the plate body there are inserts oriented in different directions, and finally when in the peripheral area of the plate body there are inserts oriented so as to direct the liquid towards the inner part of the plate.

BRIEF DESCRIPTION OF THE DRAWINGS

The invention will be described below in details on the basis of the enclosed drawings showing advantageous embodiments of the plate according to the invention and of the inserts built in the plate. In the drawings

FIG. 6 is a vertical section through an insert having a hole with vertical axis.

DESCRIPTION OF THE PREFERRED EMBODIMENTS

Figure 1:
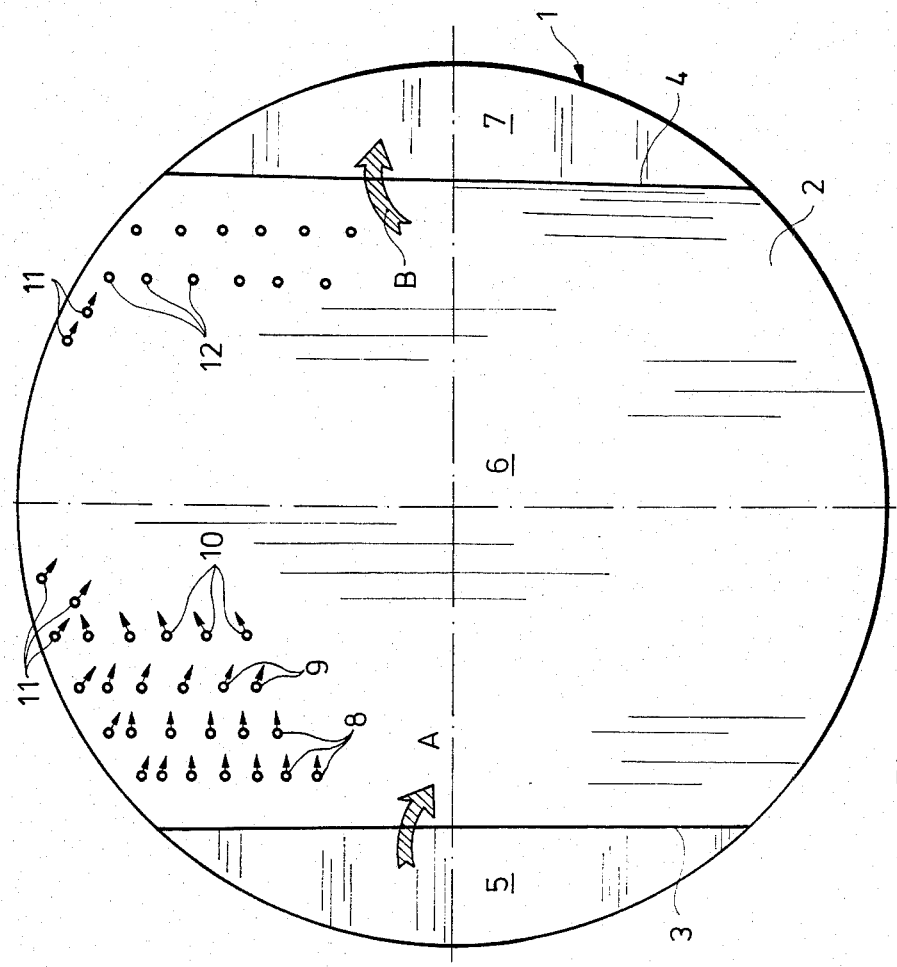
FIG. 1 shows a schematic top view of the plate according to the invention, being constructed as a simple stream cross-flow plate.

In FIG. 1 there is shown, in schematic top view, a plate 1 having plate body 2 attaching with its periphery to the inner surface of the side wall of a column (not shown) in a sealed or substantially sealed manner. The plate 1 has an inlet weir 3 and an outlet weir 4 known per se, formed e.g. by sheets of a height of about 20 mm. The flow-in direction (inlet) is shown by arrow A, and the flow-out direction (outlet) is shown by arrow B. On the left side of the inlet weir 3 there is arranged an inlet segment 5 and on the right side of the outlet weir 4 there is arranged an outlet segment 7, which are formed of solid sheets without openings. On the contrary, a plate section 6 between the weirs 3 and 4 is provided with inserts 8, 9, 10, 11 and 12 containing through holes with different orientations. These inserts may be arranged e.g. at the corners of equilateral triangles or of squares, or in some cases in a mixed arrangement. Before explaining the manner and destination of the orientation of the inserts, an advantageous possibility for the construction of the inserts will be described below.

Figure 3:
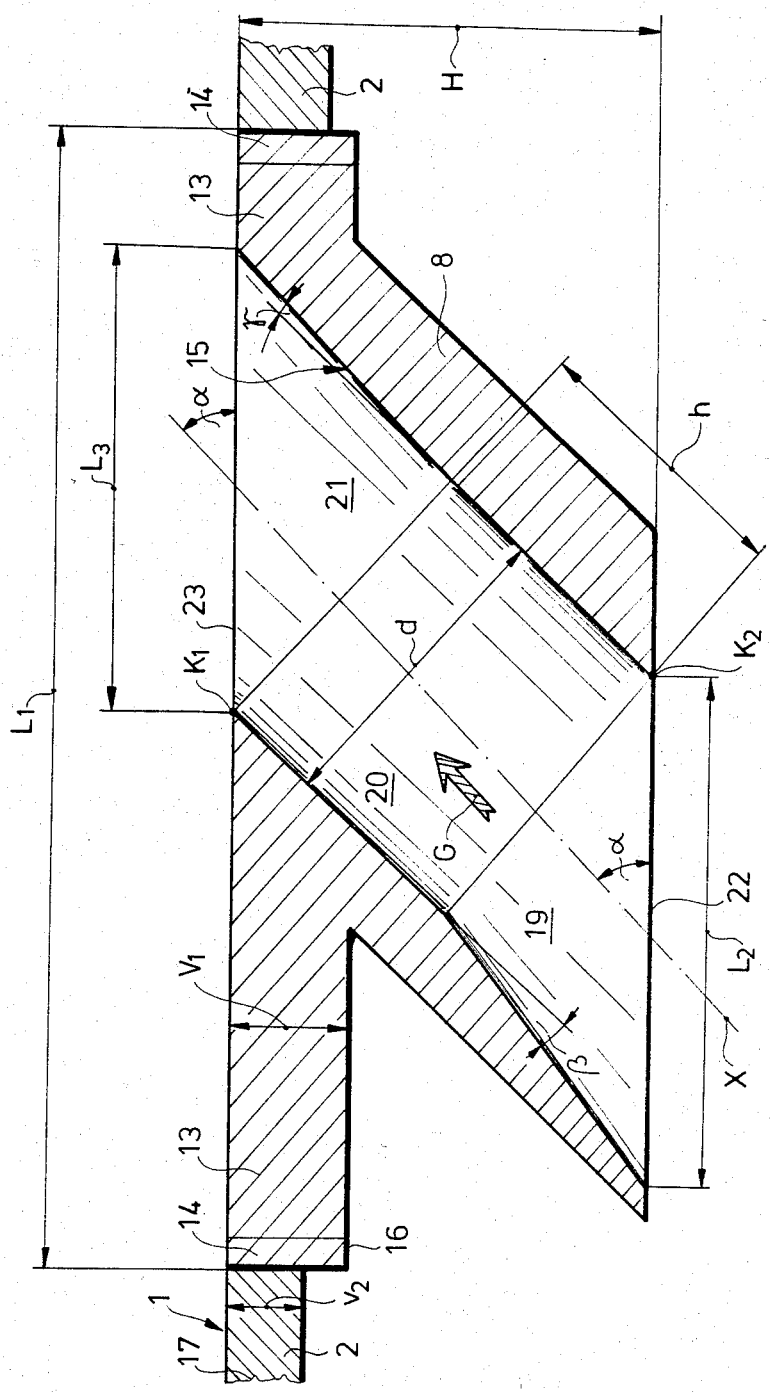
FIG. 3 is a vertical section of an insert having an inclined through hole.
Figure 4:
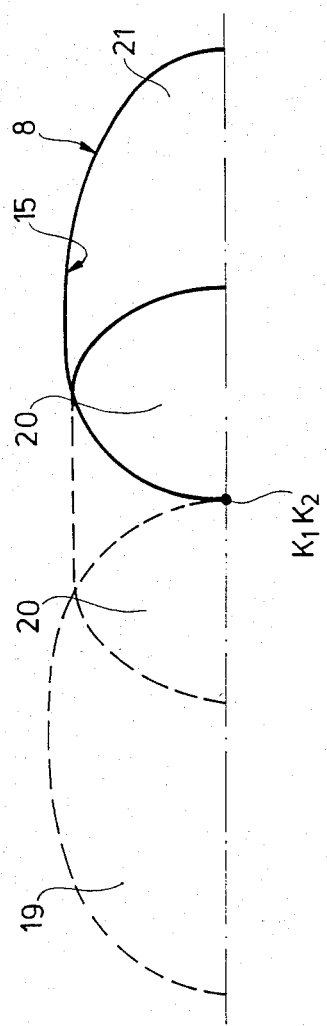
FIG. 4 is a top view on the through hole of the insert according to FIG. 3.
Figure 5:
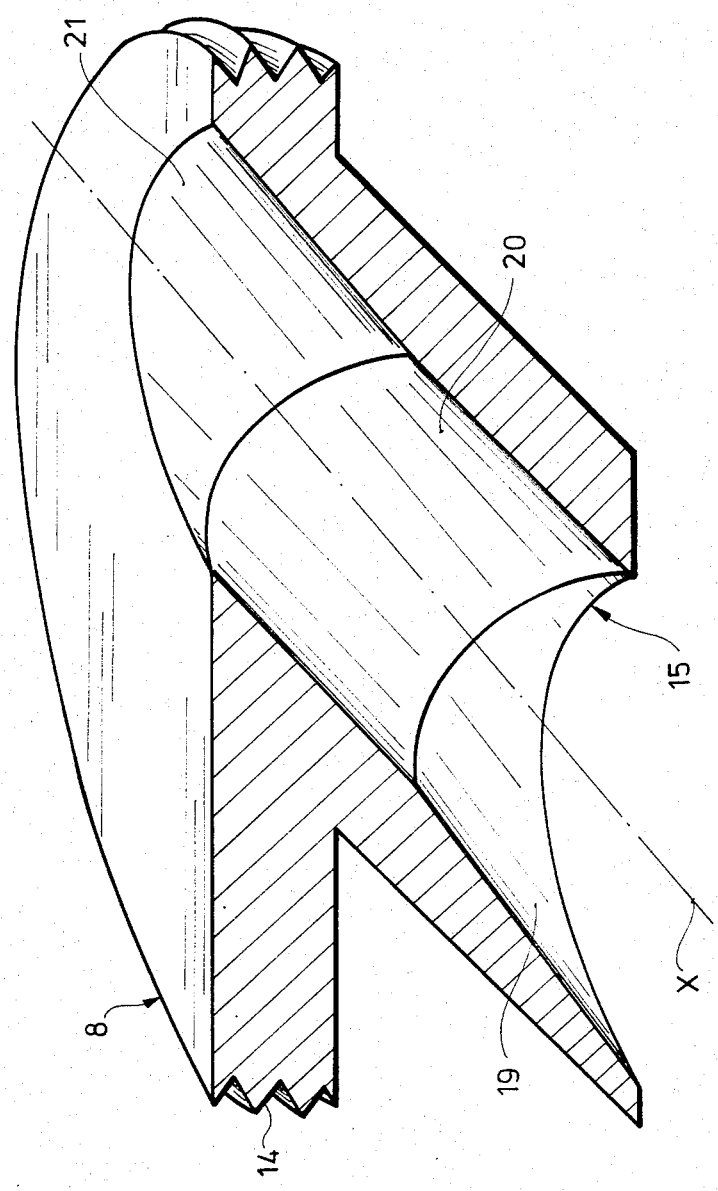
FIG. 5 shows the half part of an insert shown in FIGS. 3 and 4, in perspective view.

In FIGS. 3 to 5 there is shown an insert having in its entirety the reference numeral 8, made in this case of metal e.g. by precision casting. However, it can be produced also in other way e.g. by machining. Inserts of plastic material may be prepared e.g. by injection moulding. The insert 8 has a cylindrical peripheral flange 13 of a thickness $v_1$, the outer surface of which being provided with threads 14. The insert 8 can be connected by the aid of the threads 14 to a circular threaded opening 16 drilled perpendicularly to the plane of the plate body 2 this latter having a thickness $v_2$ (see left side of FIG. 3), however, the connection may also be established in any other way e.g. by bonding or welding, too. A through hole of the insert 8 is designated as a whole by 15 the geometrical axis x of which includes an angle $\alpha$ with the upper plane 17 of the plate body 2, and with the lower plane 18 of the insert 8, respectively. $\alpha$ is an acute angle of expediently 45°. The through hole 15 may be divided into zones 19, 20, 21. The middle zone 20 is cylindrical, its diameter $d_1$ remains constant in its whole length h. To the lower end of the cylindrical zone 20 there is connected the conical inlet zone 19 having an outwardly-downwardly increasing cross section, and to its upper end there is connected the outlet opening 21 having an outwardly-upwardly increasing cross-section. The inclined geometrical axis x of the three zones is of course common. The inlet zone 19 as well as the outlet zone 21 is geometrically formed expediently by a circular cone with inclined axis, with a missing generatrix originating from the points $K_1$ and $K_2$, respectively, lying on their base circles. This point $K_1$ of the outlet zone 21 and point $K_2$ of the inlet zone 19 are aligned in the same vertical line in this exemplified embodiment of the invention, that means that when considering the top view and bottom view, resp., no free opening can be seen: the lower inlet opening 22 is covered in its full cross section, thus, the whole quantity of the upwardly flowing vapour and/or gas is forced to stream out in the direction of the inclined axis x, even partial streams are not flowing vertically upwards. Expediently, the half cone angle $\beta$ of the inlet zone 19 is larger than the half cone angle $\gamma$ of the outlet opening 21.

It can be clearly seen from FIGS. 3 to 5 that the through hole 15 containing the zones 19, 20, 21 is formed like a Venturi tube: regarding the direction c of the vapour and/or gas flow, the inlet zone 19 is narrowing towards (inwardly to) the cylindrical middle zone 20 having a constant diameter d, and the outlet zone 21 is widening outwardly from this middle zone 20. The half cone angle $\gamma$ of the outlet (FIG. 3) should expediently be selected so that the dimension $L_3$ of the outlet opening 23 does not exceed 1.5 d. The plane of the outlet opening 23 of the insert 8 aligns with the plane 17 of the plate body 2, thus, no additional damming of the liquid takes place. The Venturi-like construction of the through hole 15 results in optimum hydraulic conditions. The hydraulic resistance can further be decreased by rounding-off the edge of the inlet opening 22 and the outlet opening 23.

Inserts 9 to 11 according to FIG. 1 can be fully identical with the insert 8 according to FIGS. 3 to 5. The structural material of the inserts has to be selected in consideration of corrosions respects: there may be used metals, different kinds of steels, glass, and plastics.

The inserts 12 in FIG. 1 have a vertical geometrical axis. Such insert is shown in details in FIG. 6, in an enlarged vertical section. The geometrical axis y of the through hole 24 is the symmetry axis of this insert. The through hole 24 consists also in this case of three zones: the conical—regarding the flow direction of the gas and/or vapour marked with arrow G—inwardly narrowing inlet zone 25, the cylindrical middle zone 26 with a constant diameter d, and the conical outwardly widening outlet zone 27. The half cone angle $\beta$ of the inlet zone 25 in form of a circular straight cone, is larger than the half cone angle $\gamma$ of the outlet zone 27. The insert 12 is formed in its entirety as a cylindrical body having threads 14 on its outer surface. The edge of the inlet opening 28 and that of the outlet opening 29 are expediently rounded-off also in this case.

Returning to FIG. 1 wherein—for the sake of clearness—only a few inserts are shown, it is apparent that in the area adjacent to the inlet weir 3 the inserts 8 are arranged so that the inclined geometrical axes of their openings are in top view perpendicular to the inlet weir 3 also in top view, this fact is clearly shown by the small arrows. In this embodiment, these inserts 8 are arranged in two rows lying parallel to the inlet weir 3, however, the number of the rows depends on the flow rate (m³/h) of the vapour and/or gas and of the liquid. Next to them, inserts 9, 10 in rows with alternately changing orientation are fixed in the plate body, the orientation of which is clearly shown by small arrows: in top view the geometrical axes of the openings include oppositely directed angles with the geometrical axes of the inserts 8. In the peripheral area of the plate 1 there are inserts 11 being (regarding the main flow direction of the liquid) oriented forwards and slithly inwardly towards the centre of the plate. Finally, in the area in front of the outlet weir 4 there are inserts 12 having vertical geometrical axes, arranged in two rows being parallel to the weir (FIG. 6), these are not marked with arrows.

As shown by arrow A, the liquid flowing over the inlet weir 3 onto the plate section 6 arrives first into the area with inserts 8. The inserts 8 are oriented so that the vapour and/or gas stream flowing therethrough transfers the liquid—through pulse transmission—towards the outlet weir 4 i.e. according to the main flow direction. As a result, there is decreased or eliminated the risk that the liquid arriving without foam onto the plate section 6 runs down, and at the same time also the range of the flow speed of the vapour and/or gas is increased. The gas and/or vapour arriving from the peripheral area of the plate body, entering through the inserts 11 at an inclined path, forces the liquid towards the centre of the plate and towards the outlet weir 4 in front of which there are arranged vertically oriented inserts 12. The vapour and/or gas flowing substantially vertically therethrough is preventing the liquid from running down unevenly through the outlet weir 4 (spouting over). In the central area of the plate section 6 the inserts 9 and 10 are arranged in rows with alternately changing orientation; these directions are expediently perpendicular to each other, thus, the vapour and/or gas entering therethrough is exerting an intensive mixing effect.

Figure 2:
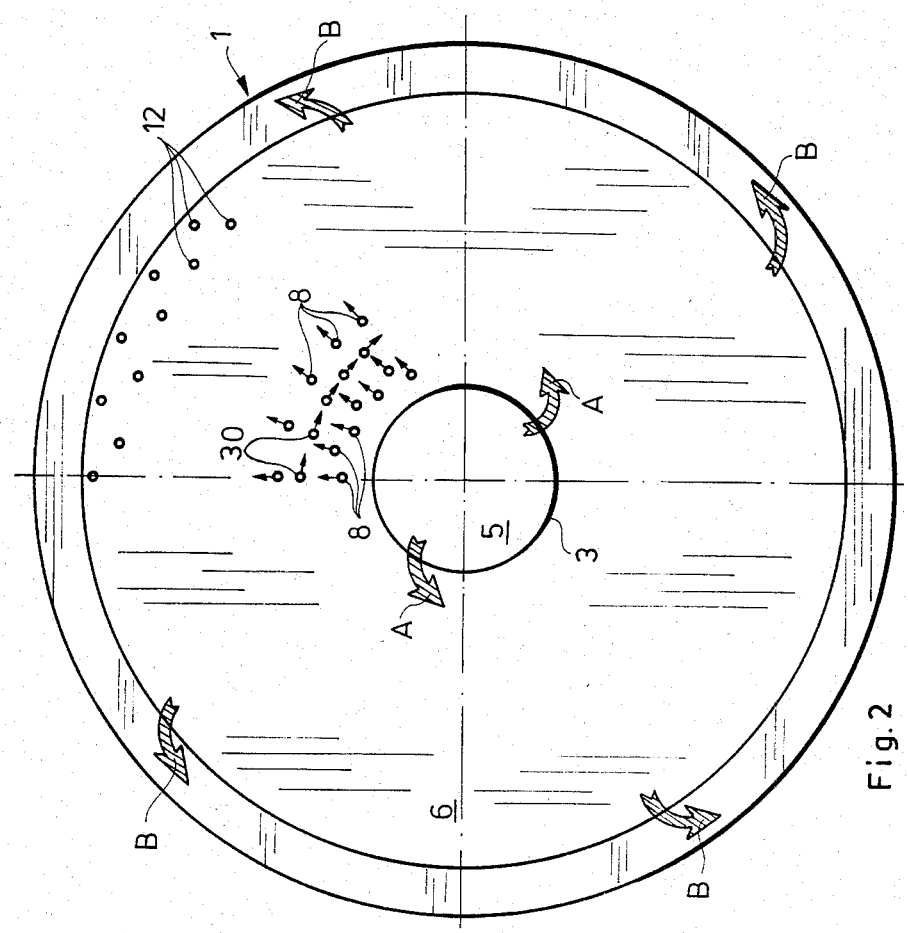
FIG. 2 shows a centrifugal plate carried out according to the invention, also in schematic top view.

The plate according to FIG. 2 is of the kind with centrifugal flow-through i.e. the inlet weir 3 is arranged around its centre, and the outlet weir 4 is arranged in its peripheral area; both weirs are of circular shape in top elevation. In this drawing the same structural elements, or parts having the same character are designated with the same reference numerals as used in FIG. 1. The liquid arrives by overflow according to arrow A onto the plate section 6 having the form of a circular ring, in which inserts 8 with inclined axis are arranged with radial orientation in two parallel rows in the area adjacent to the inlet weir 3 (FIGS. 3 to 6). Inserts 30 similarly with inclined axes, having a tangential orientation in a single direction, are arranged in the next row. Thereupon, there are arranged inserts 8, 30 in rows with alternately radial and tangential orientation as far as the outer peripheral area of the plate section 6 is reached. Finally, in the area next to the outlet weir 4 there are arranged inserts 12 having openings with vertical geometrical axis (FIG. 6); for the sake of clearness, in FIG. 2 there are shown only some of these inserts.

Flow-down of the liquid arriving without foam onto the plate according to FIG. 2 is prevented by the vapour and/or gas entering in an inclined direction from the inserts 8 arranged around the inlet weir 3. In the central area of the plate section 6, the vapour and/or gas flowing out of the inserts with alternately radial and tangential orientation, exerts an intensive mixing effect.

In the case when the inlet weir and the outlet weir of the centrifugal plate according to FIG. 2 are interchanged i.e. the liquid stream flows inwardly from the outer periphery, also the arrangement of the inserts 8, 12 has to be changed in the same sense.

As the way of fixing the plates into the column mantle (supporting, welding, threaded connection, etc.) is well known in the art, these features are not shown in the drawings. Due to the same fact also the possible technical constructions of the inlet weir and outlet weir are not shown.

The invention involves the following advantageous effects:

In view of the process to be carried out, the invention is advantageous because due to their construction like a Venturi tube, the through holes of the inserts have a lower hydraulic resistance against the vapour and/or gas flowing therethrough. In the middle part of the plate body there are always arranged inserts oriented in different directions, thus, due to their inclined position no vertical flow of the vapour and/or gas may occur. The same inserts produce a nearly perfect mixing in the spatial plane X-Y, eliminating at the same time also the hydraulic gradient which otherwise may occur due to the liquid friction. Thus, in the direction of the vertical spatial coordinate (Z) the mixing effect exerted by the pulse transmitted to the liquid due to the buoyancy exerting its effect to the vapour and/or gas bubbles, may have only a decreased importance. Due to the nearly perfect mixing, the outlet weir may in certain cases be omitted. Thereby, the hydraulic resistance (pressure drop) of the plate can be maintained at a value being lower than in case of valve plates, and simultaneously, a higher, nearly 100% efficiency can be reached. The inserts arranged with alternate orientation in the central area eliminate the risk of partial operation of the plate and prevent the liquid from backward mixing. In the inlet area the inserts oriented in the main flow direction increase the speed range of the gas and/or vapour.

From the operational viewpoint, the plate according to the invention has advantages in many aspects:

In the area where the liquid is flowing in, the risk of flow-down—which might result in a lower efficiency—is decreased; due to the construction like a Venturi tube, on the one hand, there is decreased the risk of contamination and stopping of the through holes of the inserts, and, on the other hand, the contamination which may eventually be settled down during a longer period of operation, can easily be removed from the inserts; the inserts are not subject to deformation under effect of heat, therefore, their advantageous features remain unchanged also after a longer period of operation. The plates do not contain mobile parts subject to wear—as opposed to the valve plates—which fact increases the operational safety.

The plate according to the invention is further advantageous in view of the costs: the material demand for the inserts is lower than that required for the valves of the known valve plates. The other part of the production costs of the inserts—in the case of comparable mechanization grade—is lower or not more than the same part of the costs of the valves. Preparing unthreaded holes for the inserts involves practically the same costs as preparing holes with sharp edges for the valves. In given case, preparing threaded holes for the inserts involves lower costs than providing holes for e.g. Koch-valves, and also mounting the inserts into the plate body involves lower costs than to build in valves into the plate body.

The plate bodies as well as the inserts may be prepared of several kinds of structural materials; e.g. metals, different kinds of steels, plastics, glass, etc.

The plates according to the invention may be constructed as simple or multiple stream cross-flow or centrifugal plates.

The invention is of course not restricted to the exemplified embodiments described above but it may be ralized in different ways within the scope of the claims.

We claim:

1. Plate for columns performing distillation and/or absorption processes, having through openings in the plate body provided with an inlet weir and with an outlet weir, characterized in that in the openings there are fixed inserts (8 to 12; 30) each comprising a through hole (15; 24) containing an inlet zone (19; 25) having, regarding the flow direction of the vapour and/or gas, an inwardly decreasing cross section, an intermediate cylindrical zone (20; 26) connected thereto, and as a continuation thereof, an outlet zone (21; 27) having an outwardly increasing cross section; the plate body (2) and the upper surface of the inserts (8-12; 30) are aligned in a common or essentially common plane, and that at least some of the inserts (8 to 12; 30) have through holes (15; 24) with their geometrical axis (x) being inclined under an acute angle ($\alpha$) to the upper plane of the plate body (2).

2. Plate as claimed in claim 1 characterized in that the inlet zone (19) of the through holes (15) with inclined axis (x), in top view, is at least mostly covered by the wall bounding the through hole (15).

3. Plate as claimed in claim 1 characterized in that the inlet zone (19) and the outlet zone (21) of the through holes (15) with inclined axis (x) are formed in geometrical sense by circular cones with a missing generatrix originating from one point ($K_1$; $K_2$) lying on their base circles.

4. Plate as claimed in claim 3 characterized in that the points ($K_1$; $K_2$) lying on the base circle of the inlet zone (19) and of the outlet zone (21), where no generatrix originates from, are aligned in or near to the same vertical line.

5. Plate as claimed in claim 1 characterized in that the angle ($\alpha$) included between the inclined axis of the inserts (8 to 11; 30) and the upper plane of the plate body (2) is 45° or nearly 45°.

6. Plate as claimed in claim 1 characterized in that the half cone angle ($\beta$) of the inlet zone (19; 25) is greater than the half cone angle ($\gamma$) of the outlet zone (21; 27).

7. Plate as claimed in claim 1 characterized in that the half cone angle ($\beta$) of the inlet zone is 9.5° to 10.5°, advantageously about 10°.

8. Plate as claimed in claim 1 characterized in that the half cone angle of the outlet zone (21; 27) is 3° to 4°, advantageously about 3.5°.

9. Plate as claimed in claim 1 characterized in that the edges of the inlet opening (22; 28) and of the outlet opening (23; 29) are rounded.

10. Plate as claimed in claim 1 characterized in that the through openings formed in the plate body (2) and the outer boundary surface of the inserts (8 to 12; 30) are provided with threads (14) and the inserts (8 to 12; 30) are secured in the openings through threaded connection.

11. Plate as claimed in claim 1 characterized in that in the area adjacent to the inlet weir (3) there are provided, advantageously in several rows being parallel to the outlet weir, inserts (8) in the plate body (2) wherein the inclined geometrical axes (x) of the through holes (15) are, in top view, oriented in the same or substantially the same direction as the main flow direction of the liquid across the plate (1).

12. Plate as claimed in claim 1 characterized in that in the area of the plate body (2) opposite to the inlet weir (3), advantageously adjacent to the outlet weir (4), there are provided inserts (12) containing through holes (24) with vertical geometrical axis (y), arranged expediently in several rows being parallel to each other and to the outlet weir (4).

13. Plate as claimed in claim 1 characterized in that in the central area of the plate body (2) there are inserts (9, 10; 30; 8) oriented in different directions.

14. Plate as claimed in claim 1 characterized in that in the peripheral area of the plate body (2) there are inserts (11) oriented so as to direct the liquid towards the inner part of the plate (1).

15. Plate as claimed in claim 1 characterized in that the diameter (d) of the cylindrical middle zone (20; 26) of the through hole (15; 24) is 5 to 80 mm.

* * * * *